Patented May 31, 1949

2,471,622

UNITED STATES PATENT OFFICE 2,471,622

MERCURY COMPOUNDS AND PROCESS OF PREPARING SAME

Max Hartmann and Werner Bosshard, Riehen, Switzerland, assignors to Ciba Pharmaceutical Products Inc., Summit, N. J., a corporation of New Jersey No Drawing. Application June 30, 1945, Serial No. 602,676. In Switzerland August 4, 1944

14 Claims. (Cl. 260—431)

The present invention relates to the manufacture of new mercury compounds of the formula

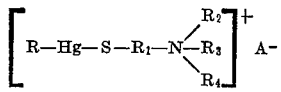

and their use in disinfectant preparations. In this formula R stands for alkyl, cycloalkyl or aryl univalent hydrocarbon radicals, such as methyl, ethyl, propyl, ethoxyethyl, methylcyclohexyl or phenyl, $R_1$ stands for alkylene, aralkylene or arylene divalent hydrocarbon radicals, such as ethylene, propylene, phenylenemethylene or phenylene, $R_2$, $R_3$ and $R_4$ stand for alkyl, such as methyl, ethyl or propyl. A stands for the radical of an alkyl-sulfuric acid, or aryl-sulfonic acid. There may especially be mentioned, for example, ethylmercurithioethyl-trimethyl - ammonium - methosulfate, ethylmercurithioethyl-diethyl - methyl- ammonium-methosulfate, propylmercurithioethyl-trimethyl-ammonium - methosulfate, dodecylmercurithioethyl-trimethyl - ammonium- methosulfate, propylmercurithioethyl–diethyl-methyl-ammonium-methosulfate, ethylmercurithioethyl-trimethyl - ammonium - para - toluenesulfonate, ethylmercurithioethyl-dimethyl-ethyl - ammonium-ethosulfate, phenylmercurithioethyl-trimethyl-ammonium-methosulfate and ethylmercurithiophenyl-trimethyl-ammonium-methosulfate.

The new mercury compounds can be obtained by quaternating mercurithioamines of the formula

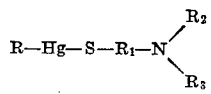

wherein R, $R_1$, $R_2$ and $R_3$ have the above indicated significance, or causing organic mercury hydroxides or salts to react with corresponding quaternary thioammonium salts.

As quaternating agents there can be used dialkylsulfates such as dimethylsulfate or diethylsulfate, or arylsulfonic acid esters such as para-toluenesulfonic acid methylester. The reactions are advantageously carried out in the presence of solvents such as alcohol. In case the mercurithioamines used as starting materials, for example, the alkyl-mercurithioalkylamines, are not known, they can be obtained by reaction of alkylmercury hydroxides or salts with thioamines such as thioalkylamines, for example, with aminoalkylmercaptans or di-aminoalkyl-disulfides. The preparation of these starting materials is advantageously conducted in alcohol in the presence of alkalies. The quaternary thioammonium salts used as starting materials are obtained by treating thioamines with quaternating agents.

It was not to be expected that the present process could be carried out, for it is surprising that the mercurithioamines are not split by the action of the quaternating agents. Thus, it had become known from G. Sachs (Annalen der Chemie, vol. 433, page 160 [1923]) that splitting of the molecule occurs in the reaction of phenylmercurithioethane with ethyliodide or benzyliodide.

The mercurithioammonium salts obtained according to the present process are readily soluble in water. They have excellent disinfecting properties and are therefore to be used as disinfectant preparations. Thus, for example, ethylmercurithioethyl-trimethyl-ammonium-methosulfate exhibits considerably better disinfecting values when tested on bacterium coli and pseudomonas pyocyaneus than quaternary ammonium salts or mercury compounds which are known as disinfectants.

The new disinfectant preparations are suitable for a very wide range of applications. Thus, they are suitable for disinfecting the skin, for example, the hands, and also instruments, bandage material, washes, sputum and the like. They may be used, for example, in the form of a solution, or a salve or powder. It has been found of advantage to admix therewith other compounds having a disinfecting action. As such additions there may be used, for example, the above indicated tertiary mercurithioamines or quaternary ammonium salts which are free from mercury, such as quaternary quinolyloxyalkyl- or phenoxyalkyl-ammonium compounds. There may be mentioned, for example, [β-(5:7-dichloro-quinolyl-(8)-oxy)-ethyl]-dimethyl - dodecyl - ammonium bromide, [β-(5:7-dichloro - quinolyl - (8) - oxy)- ethyl]-dimethyl-hexadecyl-ammonium bromide, [β-(2-methyl-5:7 - dichloro-quinolyl - (8) - oxy)- ethyl]-dimethyl-dodecyl-ammonium bromide, β-phenoxyethyl - dimethyl - dodecyl - ammonium chloride or bromide, β-phenoxyethyl-dimethyl-hexadecyl-ammonium bromide, β-(para-chlorophenoxy)-ethyl-dimethyl - dodecyl - ammonium bromide, β-(para-methyl - phenoxy) - ethyl - dimethyl - dodecyl - ammonium bromide and β - (para-tertiary octylphenoxy) - ethyl - dimethyl - dodecyl-ammonium bromide. These compounds are obtained, for example, by causing quaternating agents to act on quinolyl- or phenyl-oxyalkylamines. With the aid of these mixtures disinfectant preparations are obtained which have more valuable properties than the individual components.

The following examples illustrate the invention, the parts being by weight unless otherwise stated and the relationship of parts by weight to parts by volume being the same as that of the kilogram to the liter:

*Example 1*

16 parts of a mixture of ethyl mercury chloride and bromide are suspended in 150 parts by volume of alcohol and boiled for 20 minutes after addition of 5 parts by volume of 10 N-caustic soda solution. When cold, the mixture is filtered and the filtrate poured into a solution of dimethylaminoethylmercaptan prepared by reaction of 7.5 parts of dimethylaminoethylmercaptan-hydrochloride in 70 parts by volume of alcohol by addition of 5 parts by volume of 10 N-caustic soda solution and filtering in the cold. This solution is boiled for 1 hour under reflux, the alcohol is distilled off and the residue taken up in ether. After distilling the ether, 15 parts of the ethylmercurithioethyl-dimethylamine remain behind as a light oil which boils with weak decomposition at 124° C. under a pressure of 0.1 mm. Hg; it can also be distilled with steam.

The same compound can also be obtained in the following manner:

31 parts of a mixture of ethyl mercury chloride and bromide are introduced into 140 parts by volume of alcohol containing 2.6 parts of dissolved sodium. Further, 15 parts of bis-dimethylaminoethyl-disulfide-hydrochloride are introduced into 140 parts by volume of alcohol containing 2.3 parts of dissolved sodium, and the whole is filtered. The filtrate is added to the above solution of the ethyl mercury hydroxide and boiled for 1½ hours under reflux. The product is worked up as described above and 29 parts of the said mercury thioamine compound are thus obtained.

15 parts of the ethylmercurithioethyl-dimethylamine are taken up in 40 parts by volume of absolute alcohol, the solution is mixed with 4.4 parts by volume of dimethylsulfate and the alcohol is distilled on the water-bath after the reaction is complete. The residue is treated with ether. The ethylmercurithioethyl-trimethyl-ammonium-methosulfate insoluble in ether is left behind. Aqueous solutions of any desired concentration may be prepared therefrom.

If instead of 16 parts of a mixture of ethyl mercury chloride and bromide there are used 22.5 parts of dodecyl mercury bromide, the dodecylmercurithioethyl-trimethyl-ammonium - methosulfate is obtained in an analogous manner.

100 parts of ethylmercurithioethyl-trimethyl-ammonium-methosulfate are made up with water to 1000 parts by volume, if desired with the addition of odoriferous substances. When appropriately diluted, such a solution can be used as a disinfecting preparation.

The following solutions possess particularly advantageous properties:

100 parts of an aqueous solution of 0.2 per cent. strength of ethylmercurithioethyl - trimethyl-ammonium-methosulfate are mixed with 50, 100 or 200 parts of an aqueous solution of 0.2 per cent. strength of β-phenoxyethyl-dimethyl-dodecyl-ammoniumbromide (obtained, for example, by heating β-phenoxyethyl-dimethylamine with dodecylbromide).

50 parts of an aqueous solution of 1 per cent. strength of ethylmercurithioethyl-trimethyl-ammonium-methosulfate are introduced, while stirring, into 50 parts of an aqueous solution of 1 per cent. strength of β-phenoxyethyl-dimethyl-dodecyl-ammonium-bromide.

A solution of 3 per cent. strength of the above mentioned compounds can be prepared in a similar manner with alcohol of 50 per cent. strength.

*Example 2*

10 parts of the ethylmercurithioethyl-dimethylamine obtained according to Example 1 are caused to react with 6 parts of para-toluene-sulfonic acid - methylester. Ethylmercurithioethyl-trimethyl-ammonium-para-toluene sulfonate is obtained by working in an analogous manner.

*Example 3*

7 parts of dimethylaminoethylmercaptan-hydrochloride are dissolved in 70 parts by volume of alcohol and mixed with 1 equivalent of 10 N-caustic soda solution. The mixture is filtered and 5 parts by volume of dimethylsulfate are added. After evaporation of the alcohol and extraction with ether, 10 parts of mercaptoethyl-trimethyl-ammonium-methosulfate are left behind.

2.3 parts of this methosulfate are dissolved in 50 parts by volume of alcohol and caused to react with the ethyl mercury hydroxide obtained from 3.1 parts of a mixture of the ethylmercury chloride and bromide according to Example 1 by boiling for 1 hour under reflux. The mixture is filtered when cold, the filtrate is evaporated to dryness, the residue is taken up in water and filtered, and the ethylmercurithioethyl-trimethyl-ammonium-methosulfate described in Example 1 is thus obtained.

*Example 4*

3.1 parts of ethyl mercury bromide are suspended in 100 parts of alcohol, mixed with 1.7 parts of diethylaminoethylmercaptan-hydrochloride and 3 parts by volume of 10 N-caustic soda solution and boiled for one hour under reflux. When cold, the mixture is filtered, worked up as described in Example 1 and 3.1 parts of the ethylmercurithioethyl-diethylamine are thus obtained.

3.1 parts of this mercury compound are dissolved in 20 parts by volume of alcohol, 0.86 part by volume of dimethylsulfate is added thereto and the product worked up as described in Example 1. 3.7 parts of the ethylmercurithioethyl-diethylmethyl-ammonium-methosulfate are thus obtained.

1 part of ethylmercurithioethyl-diethyl-methyl-ammonium-methosulfate is dissolved in 10 parts of alcohol of 70 per cent. strength by volume, if desired with the addition of coloring and odoriferous substances. A tincture is thus obtained which has a good disinfecting action.

*Example 5*

A solution of n-propyl mercury hydroxide is prepared from 3.25 parts of a mixture of n-propyl mercury chloride and bromide according to Example 1, and caused to react in similar manner with 1.5 parts of dimethylaminoethylmercaptan-hydrochloride. 2.4 parts of the n-propylmercurithioethyl-dimethylamine are thus obtained.

2.4 parts of this mercury compound can be reacted with 0.7 part by volume of dimethylsulfate to form n-propylmercurithioethyl-trimethyl-ammonium-methosulfate.

1 part of propylmercurithioethyl-trimethyl-ammonium-methosulfate is dissolved with gentle heating in a salve base consisting of 65 parts of vaseline alb., 20 parts of paraffin oil, 10 parts of wool fat and 4 parts of water, and the salve thus obtained which has a disinfecting action is slowly cooled while stirring.

*Example 6*

3.25 parts of a mixture of n-propyl mercury chloride and bromide are worked up according to Example 1 and reacted with 1.7 parts of diethyl-aminoethylmercaptan-hydrochloride as described in Example 5. 2.8 parts of n-propyl-mercurithio-ethyldiethylamine are thus obtained.

These 2.8 parts of the mercury compound are caused to react with 0.7 part by volume of dimethylsulfate to form the n-propylmercurithio-ethyl-diethylmethyl-ammonium-methosulfate.

*Example 7*

6.6 parts of phenylmercury acetate in 250 parts by volume of alcohol are caused to react with 2 parts by volume of 10 N-caustic soda solution during 30 minutes on the water-bath, and filtered when cold. The filtrate is mixed with a solution of 2.2 parts of dimethylaminoethyl-mercaptan in alcohol and the alcohol is distilled off on the water-bath. The residue is taken up in alcohol and filtered. The phenyl-mercurithioethyldimethylamine is crystallized from the solution; it melts at 105–106° C. after recrystallization from alcohol.

5 parts of the obtained phenylmercurithio-ethyldimethylamine in 5 parts of alcohol are reacted on the water-bath with 1.35 parts by volume of dimethylsulfate. After distilling off the alcohol the phenylmercurithioethyl-dimethyl-ammonium-methosulfate is left behind which is readily soluble in water.

For example, the following solution having a disinfecting action can be prepared:

50 parts of an aqueous solution of 0.1 per cent. strength of phenylmercurithioethyl-trimethyl-ammonium-methosulfate are introduced into 50 parts of an aqueous solution of 0.1 per cent. strength of $\beta$-(5:7-dichloro-quinolyl-(8)-oxy)-ethyl-dimethyl-dodecyl-ammonium-bromide (obtained, for example, by heating $\beta$-[5:7-dichloro-quinolyl-(8)-oxy]-ethyl-dimethyl-amine with dodecylbromide).

*Example 8*

6.2 parts of ethyl mercury bromide are caused to react with caustic soda solution as described in Example 1 and the filtered solution is mixed with an alcoholic solution of 2.6 parts of para-mercapto-dimethylaniline. The para-ethyl-mercurithio-dimethylaniline is precipitated in crystalline form after heating for a short time. After recrystallizing from alcohol the base melts at 80° C. and is insoluble in water. 3.8 parts of the para-ethylmercurithio-dimethylaniline are dissolved in little alcohol and mixed with 1 part by volume of dimethylsulfate. The alcohol is distilled off on the water-bath and there is thus obtained the para-ethylmercurithiophenyl-trimethyl-ammonium-methosulfate which is freely soluble in water. After recrystallization from a mixture of methyl alcohol and acetic ester the product melts at 125° C.

This compound can be pressed into tablets in the following manner:

1 part of para-ethylmercurithiophenyl-trimethyl-ammonium-methosulfate is pressed into tablets with 10–50 parts of starch, sugar or urea or similar inert products.

What we claim is:

1. Mercury compounds of the formula

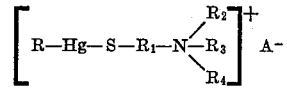

wherein R is a member selected from the group consisting of alkyl, cycloalkyl and aryl univalent hydrocarbon radicals, $R_1$ is a member selected from the group consisting of alkylene, aralkylene and arylene divalent hydrocarbon radicals, each of $R_2$, $R_3$ and $R_4$ represents an alkyl univalent hydrocarbon radical, and A is an anion selected from the group consisting of alkyl sulfate ions and aryl sulfonate ions.

2. Alkylmercurithioalky-trialkyl-ammonium-alkyl-sulfates.

3. Phenylmercurithioalkyl-trialkyl-ammonium-alkyl-sulfates.

4. Alkylmercurithiophenyl-trialkyl-ammonium-alkylsulfates.

5. Ethylmercurithioethyl-trimethyl-ammonium-methosulfate.

6. Phenylmercurithioethyl-trimethyl-ammonium-methosulfate.

7. Ethylmercurithiophenyl-trimethyl-ammonium-methosulfate.

8. Process for the manufacture of a mercury compound comprising treating a mercurithioamine of the formula

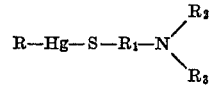

wherein R is a member selected from the group consisting of alkyl, cycloalkyl and aryl univalent hydrocarbon radicals, $R_1$ is a member selected from the group consisting of alkylene, aralkylene and arylene divalent hydrocarbon radicals, and each of $R_2$ and $R_3$ represents an alkyl univalent hydrocarbon radical, with an ester of the formula $R_4$—A wherein $R_4$ represents an alkyl univalent hydrocarbon radical and A is an anion selected from the group consisting of alkyl sulfate ions and aryl sulfonate ions.

9. Process for the manufacture of a mercury compound comprising reacting an alkylmercuri-thioalkyl-dialkylamine with a dialkylsulfate.

10. Process for the manufacture of a mercury compound comprising reacting a phenylmercuri-thioalkyl-dialkylamine with a dialkylsulfate.

11. Process for the manufacture of a mercury compound comprising reacting an alkylmercuri-thiophenyl-dialkylamine with a dialkylsulfate.

12. Process for the manufacture of a mercury compound comprising reacting ethylmercuri-thioethyl-dimethylamine with dimethylsulfate.

13. Process for the manufacture of a mercury compound comprising reacting phenylmercuri-thioethyl-dimethylamine with dimethylsulfate.

14. Process for the manufacture of a mercury compound comprising reacting ethylmercuri-thiophenyl-dimethylamine with dimethylsulfate.

MAX HARTMANN.
WERNER BOSSHARD.

(References on following page)

REFERENCES CITED

The following references are of record in the file of this patent:

UNITED STATES PATENTS

| Number | Name | Date |
|---|---|---|
| 1,672,615 | Kharasch | June 5, 1928 |
| 2,060,850 | Calcott | Nov. 17, 1936 |
| 2,087,131 | Taub | July 13, 1937 |
| 2,129,376 | Kharasch | Sept. 6, 1938 |

FOREIGN PATENTS

| Number | Country | Date |
|---|---|---|
| 199,452 | Switzerland | Aug. 31, 1938 |

OTHER REFERENCES

Rawlins et al., Jr. of the Amer. Pharm. Assoc., vol. 32, 1943, pages 11 to 16.

"Sidgwick's Organic Chemistry of Nitrogen," 1937, pgs. 27, 28 and 29.

Certificate of Correction

Patent No. 2,471,622.　　　　　　　　　　　　　　　　　　　May 31, 1949.

MAX HARTMANN ET AL.

It is hereby certified that error appears in the printed specification of the above numbered patent requiring correction as follows:

Column 3, line 32, for "2 6 parts" read *2.6 parts*;

and that the said Letters Patent should be read with this correction therein that the same may conform to the record of the case in the Patent Office.

Signed and sealed this 1st day of November, A. D. 1949.

[SEAL]

THOMAS F. MURPHY,
*Assistant Commissioner of Patents.*